United States Patent
Ogino

[11] 4,172,635
[45] Oct. 30, 1979

[54] ZOOM LENS SYSTEM

[75] Inventor: Shuji Ogino, Osaka, Japan

[73] Assignee: Minolta Camera Kabushiki Kaisha, Osaka, Japan

[21] Appl. No.: 925,982

[22] Filed: Jul. 19, 1978

[30] Foreign Application Priority Data

Jul. 28, 1977 [JP] Japan .................. 52-90981

[51] Int. Cl.² .............................................. G02B 15/18
[52] U.S. Cl. .................................................. 350/184
[58] Field of Search ....................... 350/176, 184, 186

[56] References Cited
U.S. PATENT DOCUMENTS 3,074,317  1/1963  Cox et al. ........................... 350/186

Primary Examiner—Paul A. Sacher
Attorney, Agent, or Firm—Jackson, Jones & Price

[57] ABSTRACT

A wide angle zoom lens system having a front lens group of a positive refractive power with an extended zoom ratio. A second lens group is located adjacent the first lens group and has sufficient negative refractive power so that the combined refractive power of the first and second lens group is negative. The first and second lens groups are movable as a fixed unit for a zooming operation in a first zoom range defined between the shortest focal length and a medium focal length. These same lens groups are separable for a zooming operation in a second zoom range between the medium focal length and the longest focal length.

4 Claims, 24 Drawing Figures

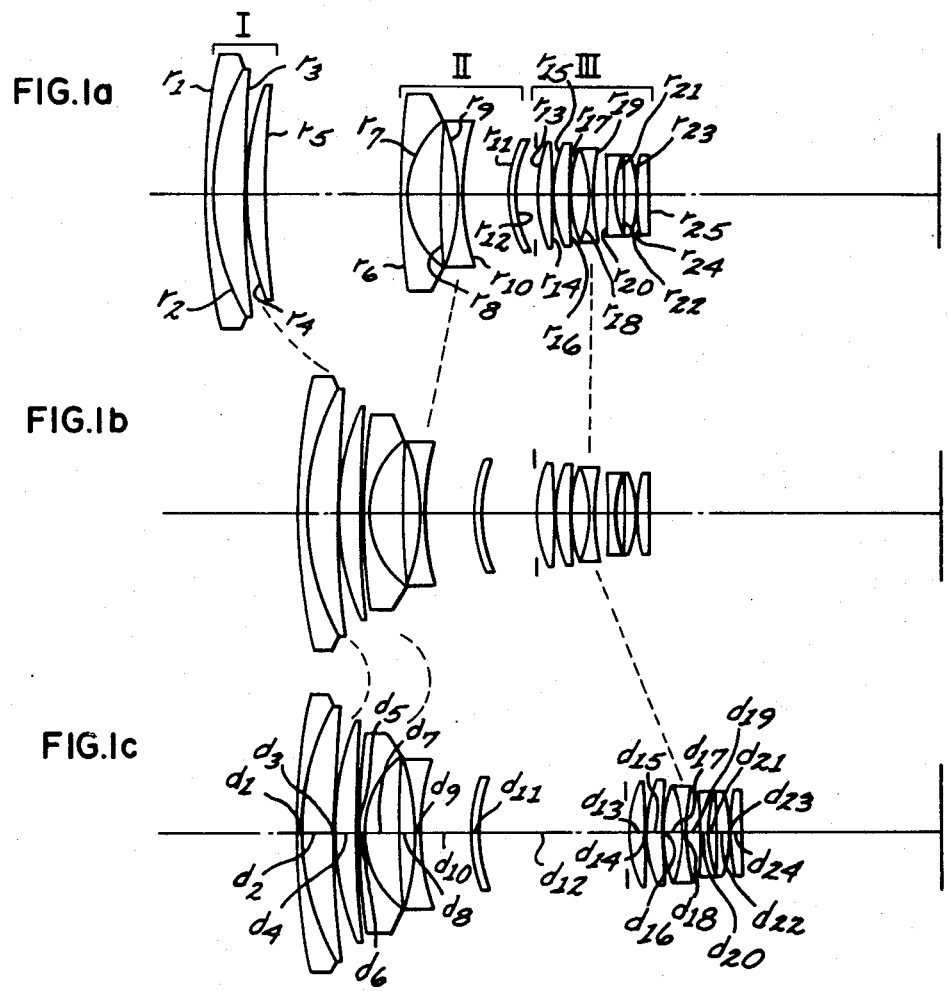

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

— Sagittal
--- Meridional

Astigmatism

Distortion

Spherical Aberration
Sine Condition

— Sagittal
--- Meridional

Astigmatism

Distortion

Spherical Aberration
Sine Condition

Astigmatism

Distortion

Spherical Aberration
Sine Condition

Astigmatism

Distortion

ZOOM LENS SYSTEM

BACKGROUND OF THE INVENTION

1. Field of the Invention

The present invention relates to a zoom lens system and more particularly to a zoom lens system capable of wide angle photography.

2. Description of the Prior Art

It is well known that a negative lead zoom lens system having a negative front lens group is suitable for a zooming mode of operation in a wide angle photography range since the power distribution of such a zoom lens system is of an inverted telephoto type. The negative lead zoom lens system design, however, is not favorable for increasing the zoom ratio. This is because that the compactness of this type of system along its optical axis is lost if the system is designed with a strained great zoom ratio. Also the difficulty of aberration correction is increased if the zoom ratio is desired to be increased by extending the zoom range toward the telephoto range.

It is also generally known that a conventional positive lead zoom lens system having a positive front lens group is favorable for zooming in a telephoto range and for reducing the bulkiness of the system along the optical axis. In the positive lead zoom lens systems, the focusing operation is preferably accomplished by shifting the positive front lens group. The alternative shifting of the entire lens system for a focusing operation requires a complex barrel mechanism to provide a change in the amount of shift in accordance with focal length variation.

The adoption of a front lens group focusing in the positive lead zoom lens group is limited to photograph of a field angle less than about 60 degrees. If a positive lead zoom lens system with front lens group focusing is desired to be designed so as to enable a wider angle of photograph than a field angle of 60 degrees, the diameter of the front lens group would be greatly increased to permit the light rays in the entire field angle to enter the lens system. This would result in a zoom lens system having a front diameter beyond a practical size. Thus, generally a positive lead zoom lens system is considered unfavorable for wide angle photography. Various zoom lens systems of negative first lens group or positive first lens groups are known in the patented prior art, such as U.S. Pat. No. 3,848,969; U.S. Pat. No. 3,788,731; U.S. Pat. No. 3,771,853; U.S. Pat. No. 3,549,235; U.S. Pat. No. 4,063,800; U.S. Pat. No. Re 29,237; U.S. Pat. No. 3,975,089; U.S. Pat. No. 4,017,161 and U.S. Pat. No. 3,937,562.

There is still a demand for a compact zoom lens capable of wide angle photography with an extended zoom ratio.

SUMMARY OF THE INVENTION

An object of the present invention is to provide a zoom lens system having a zoom ratio greater than 2.5 and capable of wide angle photography.

Another object of the present invention is to provide a zoom lens system of a relatively large zoom ratio capable of wide angle photography while maintaining a compact size.

Still another object of the present invention is to provide a compact size zoom lens system of a relatively large zoom ratio capable of wide angle photography with tolerable aberration corrections.

According to the present invention, a first front lens group of a positive refractive power and a second lens group adjacent the first front lens group, at the image side thereof, are provided. The second lens group has a sufficient negative refractive power, relative to the positive refractive power of the first front lens group, that the entire refractive power of the collective first and second lens groups are negative. The first and second lens groups are movable as a fixed unit in a first zoom range from the shortest focal length to an intermediate range and are separable from each other in a second zoom range extending toward the longest focal length. In this construction, the zoom lens system is of a negative lead type in the first zoom range and is of a positive lead type in the second zoom range.

With respect to the specific lens element construction complimentarily to the second lens group at the image side thereof and the detailed lens group movements for zooming or focusing, various modifications are possible within the ordinary skill of a lens designer once a zoom lens system is designed in accordance with the teaching of the present invention. That is to change the zoom system between a negative lead type and a positive lead type by different movements of the first and second lens groups of the present invention across the total zoom range.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 1a is a schematic view of an embodiment of the present invention in its longest focal length position with the system focused on infinity;

FIG. 1b is a schematic view of the embodiment of FIG. 1a in a medium focal length position with the system focused on infinity;

FIG. 1c is a schematic view of the embodiment of FIG. 1a in its shortest focal length position with the system focused on infinity;

FIGS. 2a to 2c are respectively graphical plots of aberration curves of the embodiment in the position of FIG. 1a;

DESCRIPTION OF THE PREFERRED EMBODIMENT

Figure 2A:
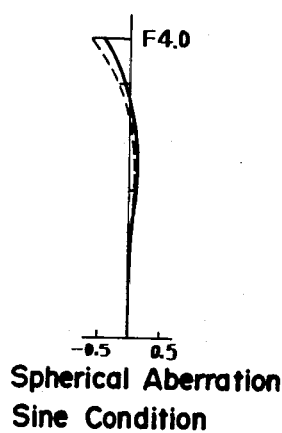

The following specification, taken in conjunction with the drawings, sets forth the preferred embodiment of the present invention in such a manner that any person skilled in the optical field can utilize the invention. The embodiment of the invention disclosed herein, are the best modes contemplated by the inventor in carrying out his invention in a commercial environment, though it should be understood that various modifications can be accomplished within the parameters of this invention.

The present invention is directed to teaching a person skilled in the optical field how to provide a zoom lens system having a relatively large zoom ratio while providing wide angle photography. The zoom lens system is schematically disclosed in FIGS. 1a through 1c in a conventional lens diagram. The zoom lens system comprises a first lens group I having a positive focal length and a second lens group II having a negative focal length adjacent to and on the image side of the first lens group. The resulting composite focal length of both the first and second lens groups is negative. The first and second lens group can be joined together into a single fixed unit for zooming purposes over a sub-range from the shortest focal length to a medium or intermediate focal length. The specific lens barrel mechanism and design for effectuating the joining of two separate lens groups in a fixed relationship for joint movement is well known in the prior art and need not be disclosed herein. The first and second lens group are further separable to be independent from each other during zooming over a second sub-range from the intermediate focal length to the longest focal length.

As a result of the above arrangement, a negative lead zooming mode of operation is possible over a portion of the variable focal range between the minimum focal length to an intermediate focal length. In this focal length an overall negative lens group is utilized comprising the first and second lens group held together in a fixed relationship. A positive lead zooming mode of operation having a positive lens arrangement is possible over another portion of the focal range between the intermediate and the maximum focal length.

In effectuating the design objectives of the present invention, it has been discovered that the zoom lens system according to this invention should satisfy the following conditions;

$$f_s < |f_{1,2}<s>| < 2.5 f_s \quad (1)$$

$$0.5 f_L < f_1 < 1.5 f_L \quad (2)$$

wherein $f_1$ is the focal length of the first lens group;
$f_L$ is the longest focal length of the zoom lens system;
$f_s$ is the shortest focal length of the zoom lens system; and $f_{1,2}<s>$ is the composite focal length of the first and second lens groups when the zoom lens system is in the mode of its shortest focal length.

The conditional expression (1) is pertinent to a zooming operation over the subrange from the shortest focal length to an intermediate focal length. Thus, when the expression (1) is satisfied, a negative-lead zooming system which is advantageous in a wide-angle zooming operation is ensured since the composite focal length of the first and second lens groups is then held within suitable limits and the first and second lens groups are shifted as a unit.

If the left-hand term of the conditional expression (1) is not satisfied, spherical aberration, coma, etc. will then be difficult to compensate. Additionally, the image-forming relationship, with respect to a positive lens group behind the second lens group, will be such that the image distance will be larger than the object distance and it will become difficult to obtain the desired zoom ratio unless the first and second lens groups are shifted from the state of the shortest focal length to a direction leading to an increased overall length of the system, thus frustrating any attempt to provide a compact lens system. If the right-hand term of the conditional expression (1) is not satisfied, the desired zoom ratio cannot be obtained unless the amount of shift is increased, with the result that the diameter of the frontmost lens element will have to be increased to an undesirable size.

The conditional expression (2) is pertinent to a zooming mode of operation in the subrange from the intermediate focal length to the longest focal length of the system. Over this range, zooming is accomplished by increasing the airspace between the first lens group and the second lens group as the longest focal length is approached. Furthermore, the positive refracting power of the first lens group I is utilized to reduce the diameter of the envelope of light pencil rays incident on the second and subsequent lens elements and thereby to maintain both the aberration characteristics and the maximum diameter of diaphragm aperture within practical limits.

The conditional expression (2) further governs the relationship between the focal length of the first lens group and the longest focal length of the zoom lens system. Thus, unless the right-hand term of the expression (2) is satisfied, the abovementioned desire to reduce the diameter of the light pencil rays incident on the second and subsequent lens elements will not be adequately accomplished and if, for focusing purposes, the first lens group I is shifted, the required amount of shift would be impractically large.

If the left-hand term of the conditional expression (2) is not satisfied, the focal length of the first lens group I will be too small and if a veriator function and corrector function are imposed on the second lens group II and the first lens group I, respectively, the airspace between the first and second lens groups on the longer focal length side will be reduced, thus making it difficult to compensate for spherical aberration, coma, etc.

The manner of focusing the zoom lens system of this invention will now be described. The mode of focusing suitable for the zoom lens system of this invention consists of first, shifting the first and second lens groups as a unit over a subrange from the shortest focal length to an intermediate focal length and second, shifting only the first lens group over the subrange from the intermediate focal length to the longest focal length. While it would be most advantageous to shift the positive first lens group I alone across the entire varifocal range for mechanical simplicity of the lens barrel, it is impractical to do so because the diameter of a front-most lens element would have to be significantly increased to an impractical extent on the short focal length side. By shifting the first and second lens groups as a unit in the short focal length subrange, that is to say by shifting a negative lens group, the diameter of the frontmost lens element need not be increased.

In doing so, the right-hand term of the conditional expression (1) must be complied with. Unless this condition is satisfied, the amount of shift of the first and second lens groups will have to be large and, to obtain a sufficient level of illumination in the marginal area of the film frame at the shortest focal length, the frontmost lens element will have to be too large in diameter.

Moreover, in the long focal length subrange, it is a desirable focusing method to shift the first lens group that is to say the positive lens group, as mentioned above. In contrast, if the first and second lens groups are shifted as a unit in the long focal length subrange, the amount of shift should be changed in accordance with the focal length setting since the airspace between the groups is varied in accordance with the zooming operation and, consequently, the composite focal length of the first and second lens groups is altered. Such an arrangement would complicate the lens barrel mechanism. To focus by shifting the first lens group in the long focal length subrange, the right-hand term of the conditional expression (2) must be complied with and, if this condition is not met, the amount of shift would have to be too large.

Aside from the focusing method described above, other methods such as a method involving a shifting of the entire system may also be employed.

The following Table shows an embodiment of this invention.

TABLE (Embodiment)
$f = 28.85 \sim 97.0$    $F_{No.} = 4.1$    $2\omega = 75° \sim 24°$

| | Radius of Curvature | | Axial Distance | Refractive Index | Abbe Number |
|---|---|---|---|---|---|
| I | $r_1$ | 166.67 | | | |
| | | | $d_1$ 1.7 | $N_1$ 1.8052 | $\nu_1$ 25.4 |
| | $r_2$ | 60.98 | | | |
| | | | $d_2$ 8.2 | $N_2$ 1.7495 | $\nu_2$ 50.1 |
| | $r_3$ | 526.0 | | | |
| | | | $d_3$ 0.1 | | |
| | $r_4$ | 73.56 | | | |
| | | | $d_4$ 4.7 | $N_3$ 1.7495 | $\nu_3$ 50.1 |
| | $r_5$ | 284.8 | | | |
| | | | $d_5$ (variable) | | |
| II | $r_6$ | 176.63 | | | |
| | | | $d_6$ 1.5 | $N_4$ 1.7495 | $\nu_4$ 50.1 |
| | $r_7$ | 20.88 | | | |
| | | | $d_7$ 8.3 | | |
| | $r_8$ | 282.3 | | | |
| | | | $d_8$ 3.94 | $N_5$ 1.8052 | $\nu_5$ 25.4 |
| | $r_9$ | −55.56 | | | |
| | | | $d_9$ 1.2 | $N_6$ 1.7495 | $\nu_6$ 50.1 |
| | $r_{10}$ | 55.58 | | | |
| | | | $d_{10}$ 11.5 | | |
| | $r_{11}$ | 27.23 | | | |
| | | | $d_{11}$ 2.2 | $N_7$ 1.8052 | $\nu_7$ 25.4 |
| | $r_{12}$ | 30.16 | | | |
| | | | $d_{12}$ (variable) | | |
| | $r_{13}$ | 29.90 | | | |
| | | | $d_{13}$ 4.0 | $N_8$ 1.5176 | $\nu_8$ 53.5 |

TABLE-continued (Embodiment)
$f = 28.85 \sim 97.0$    $F_{No.} = 4.1$    $2\omega = 75° \sim 24°$

| | Radius of Curvature | | Axial Distance | Refractive Index | Abbe Number |
|---|---|---|---|---|---|
| III | $r_{14}$ | −177.28 | | | |
| | | | $d_{14}$ 0.1 | | |
| | $r_{15}$ | 34.25 | | | |
| | | | $d_{15}$ 4.0 | $N_9$ 1.5176 | $\nu_9$ 53.5 |
| | $r_{16}$ | 186.87 | | | |
| | | | $d_{16}$ 0.1 | | |
| | $r_{17}$ | 33.48 | | | |
| | | | $d_{17}$ 4.5 | $N_{10}$ 1.5176 | $\nu_{10}$ 53.5 |
| | $r_{18}$ | −40.0 | | | |
| | | | $d_{18}$ 1.0 | $N_{11}$ 1.7495 | $\nu_{11}$ 50.1 |
| | $r_{19}$ | 50.61 | | | |
| | | | $d_{19}$ 3.5 | | |
| | $r_{20}$ | −185.16 | | | |
| | | | $d_{20}$ 2.0 | $N_{12}$ 1.8052 | $\nu_{12}$ 25.4 |
| | $r_{21}$ | 25.31 | | | |
| | | | $d_{21}$ 2.0 | | |
| | $r_{22}$ | −1719.0 | | | |
| | | | $d_{22}$ 3.0 | $N_{13}$ 1.5176 | $\nu_{13}$ 53.5 |
| | $r_{23}$ | −30.41 | | | |
| | | | $d_{23}$ 0.1 | | |
| | $r_{24}$ | 57.53 | | | |
| | | | $d_{24}$ 3.0 | $N_{14}$ 1.5176 | $\nu_{14}$ 53.5 |
| | $r_{25}$ | −224.0 | | | | focal length of the first group I : 100.0
focal length of the second group II : −25.64
focal length of the third group III : 40.27
the shortest focal length of the system : 28.85
medium focal length of the system : 50.0
the longest focal length of the system : 97.0

| focal length of the system | 28.85 | 50.0 | 97.0 |
|---|---|---|---|
| $d_5$ | 0.63 | 0.63 | 32.397 |
| $d_{12}$ | 36.906 | 13.811 | 4.383 |

The invention will now be further described by way of the preferred embodiment in the above Table. FIG. 1 is a schematic view showing the lens arrangement according to this embodiment with the system focussed on infinity. This lens system consists of the first lens group I and a second lens groups II which are positive and negative, respectively, and a positive third lens group III which is disposed behind them. FIGS. 1a, 1b and 1c show the relative positions of the groups at respectively the longest focal length, an intermediate focal length and a shortest focal length. Because, over the range from the position of FIG. 1c to the position FIG. 1b, the first and second lens groups are axially shifted as a unit, the airspace between the rear face of the second group II and the front face of the third group III is varied. Thus, a two-group zooming system is employed for this subrange.

In this embodiment, the composite focal length of the first and second lens groups is $f_{1,2}<s> = -39.11$ and the shift of these lens groups is a reverse U-turn movement with the point closest to the image surface occurring at the overall system focal length of 39.11. The third lens group III moves from the image side toward the object side over the subrange from the shortest focal length to the intermediate focal length.

Moreover, in the range between FIG. 1c to FIG. 1b, focusing is effected by shifting the first and second groups as a unit, the amount of shift at a photographing distance of 2 m is 0.818 mm. In the range from FIG. 1b to FIG. 1a, the first lens group I moves toward the object side and the second lens group II moves toward the image side, with the third group being stationary with respect to the image surface. However, it is possible to cause the third lens group to be shifted toward the image side or the object side. This allows an increased latitude in lens design and such a solution permitting a ree group movement in the range of FIG. 1a to 1b can of course exist.

If, in the subrange shown in FIG. 1b through FIG. 1a, focusing is accomplished with only the first lens group shifted, its amount of shift will be 5.821 mm for a photographing distance of 2 m.

Figure 2B:
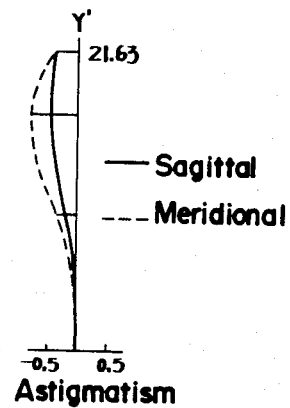
Figure 2C:
Figure 3A:
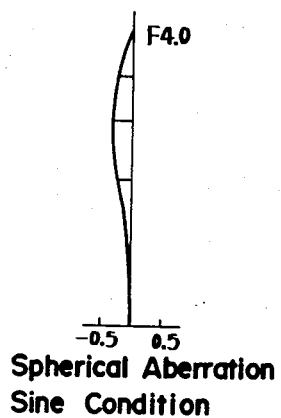
FIGS. 3a to 3c are respectively graphical plots of aberration curves of the embodiment in the position of FIG. 1b.
Figure 3B:
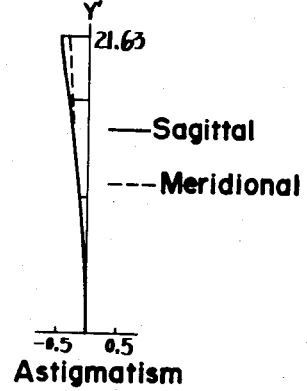
Figure 3C:
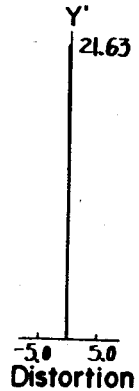
Figure 4A:
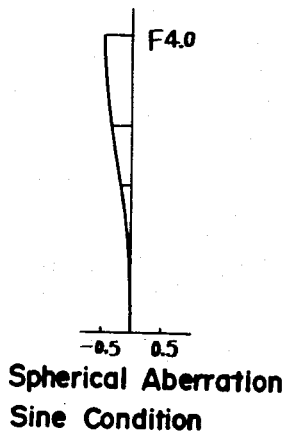
FIGS. 4a to 4c are respectively graphical plots of aberration curves of the embodiment in the position of FIG. 1c.
Figure 4B:
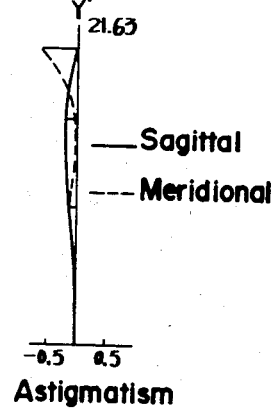
Figure 4C:
Figure 5A:
FIGS. 5a to 5c are graphical plots of aberration curves of the embodiment in a position in which the first lens group I, is shifted forward from the position of FIGS. 1a to focus the system to a photographing distance of 2 meters.
Figure 5B:
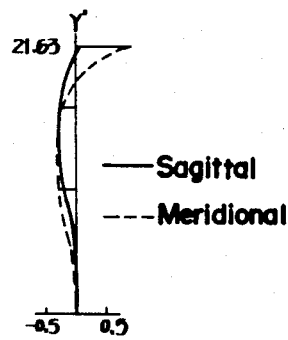
Figure 5C:
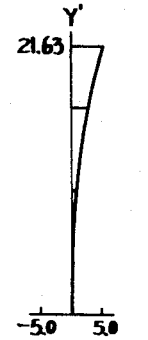
Figure 6A:
FIGS. 6a to 6c are graphical plots of aberration curves of the embodiment in a position in which the first lens group I, is shifted forwarded from the position of FIG. 1b to focus the system to a photographing distance of 2 meters.
Figure 6B:
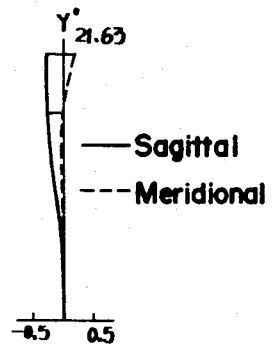
Figure 6C:
Figure 7A:
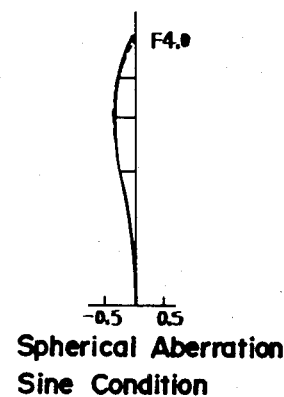
FIGS. 7a to 7c are graphical plots of aberration curves of the embodiment in a position in which the first and second lens groups, I and II, are shifted forward as a unit form the position of FIG. 1b to focus the system to a photographing distance of 2 meters.
Figure 7B:
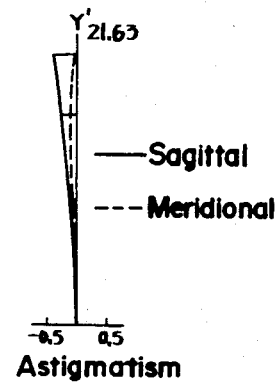
Figure 7C:
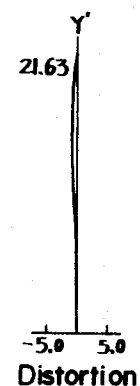
Figure 8A:
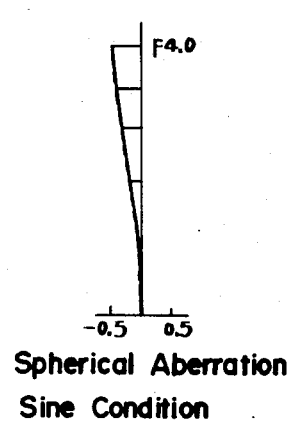
FIGS. 8a to 8c are graphical plots of aberration curves of the embodiment in a position in which the first and second lens groups, I and II, are shifted forward as a unit form the position of FIG. 1c to focus the system to a photographing distance of 2 meters.
Figure 8B:
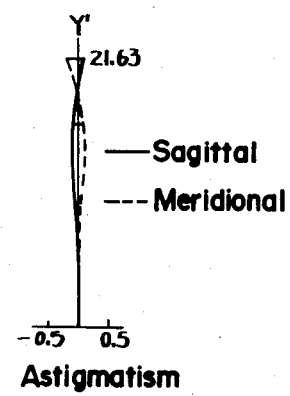
Figure 8C:

FIGS. 2 through 4 disclose the aberration diagrams corresponding to the positions illustrated in FIGS. 1a through 1c, respectively. FIGS. 5 and 6 are aberration diagrams for a photographing distance of 2 m when the first lens group is shifted for focusing purposes from the positions of FIG. 1a and FIG. 1b, respectively. FIGS. 7 and 8 are aberration diagrams for a photographing distance of 2 m when the first and second lens groups, having a negative composite focal length, are shifted as a unit from the positions of FIGS. 1b and 1c, respectively.

It will be apparent from the above description that this invention provides a zoom lens system with a high zoom ratio, i.e. with a varifocal range extended well into the wide angle region, in a compact construction. This is accomplished by the adoption of a negative-lead zooming system for wide-angle zooming with the first and a second lens group shifted as a unit over the short focal length subrange and a positive-lead zooming system in the long focal length subrange with the first lens group having a positive focal length and the second lens group separated.

While the above embodiments have been disclosed as the best mode presently contemplated by the inventor, it should be realized that these examples should not be interpreted as limiting, because artisans skilled in this field, once given the present teachings, can vary from these specific embodiments.

Accordingly, the scope of the present invention should be determined solely from the following claims in which we claim:

1. A wide angle zoom lens system comprising:
   a first front lens group of a positive refractive power;
   a second lens group located next to the first front lens group at the image side thereof, the second lens group having a negative refractive power of such magnitude relative to the positive refractive power of the first front lens group that the combined refractive power of the first and second lens groups is negative; and
   a plurality of lens elements located at the image side of the second lens group to provide as a whole a positive refractive power, where the first and second lens groups are movable as a fixed unit for a zooming operation in a first zoom range defined between the shortest focal length and a medium focal length and are separable from each other in a second zoom range defined between the medium focal length and the longest focal length.

2. A zoom lens system as in claim 1, wherein the first and second lens groups are shiftable in a fixed relationship for a focusing operation in the first zoom range while only the first lens group is shiftable for a focusing operation in the second zoom range.

3. A zoom lens system as in claim 1 wherein the plurality of lens elements form a third lens group of a positive refractive power and the airspace between the second and third lens groups is variable in the first zoom range during a zooming operation while the airspace between the first and second lens groups is variable in the second zoom range for a zooming operation.

4. A zoom lens system as in claim 3, wherein the first and second lens groups are shiftable in a fixed relationship and the third lens group is also shiftable with varying the airspace between the second and third lens groups for a zooming operation in the first zoom range, the first and second lens groups being shiftable with varying the airspace between the first and second lens groups while the third lens group remains stationary for a zooming operation in the second zoom range.

* * * * *